US010551269B2

(12) United States Patent
Joly et al.

(10) Patent No.: US 10,551,269 B2
(45) Date of Patent: Feb. 4, 2020

(54) SENSOR FOR MEASURING THE PRESSURE PREVAILING IN A MOTOR VEHICLE CYLINDER HEAD

(71) Applicants: CONTINENTAL AUTOMOTIVE FRANCE, Toulouse (FR); CONTINENTAL AUTOMOTIVE GMBH, Hannover (DE)

(72) Inventors: Matthieu Joly, Rabastens (FR); Cyrille Patri, Villeneuve Tolosane (FR)

(73) Assignees: CONTINENTAL AUTOMOTIVE FRANCE, Toulouse (FR); CONTINENTAL AUTOMOTIVE GMBH, Hannover (DE)

(*) Notice: Subject to any disclaimer, the term of this patent is extended or adjusted under 35 U.S.C. 154(b) by 158 days.

(21) Appl. No.: 15/568,982

(22) PCT Filed: Apr. 26, 2016

(86) PCT No.: PCT/EP2016/000658
§ 371 (c)(1),
(2) Date: Oct. 24, 2017

(87) PCT Pub. No.: WO2016/173703
PCT Pub. Date: Nov. 3, 2016

(65) Prior Publication Data
US 2018/0128700 A1   May 10, 2018

(30) Foreign Application Priority Data
Apr. 29, 2015 (FR) .................... 15 53900

(51) Int. Cl.
G01L 23/10   (2006.01)
G01L 19/06   (2006.01)

(52) U.S. Cl.
CPC .......... *G01L 23/10* (2013.01); *G01L 19/0681* (2013.01)

(58) Field of Classification Search
CPC ................. G01L 23/10; G01L 19/0681
See application file for complete search history.

(56) References Cited

U.S. PATENT DOCUMENTS 3,857,287 A     12/1974  Sonderegger et al.
5,513,534 A  *  5/1996   Brechbuhl ............ G01L 9/0044
                                                    73/708
(Continued)

FOREIGN PATENT DOCUMENTS

CH      537 013 A     5/1973
CN   104145108 A    11/2014
(Continued)

OTHER PUBLICATIONS

International Search Report, dated Jul. 29, 2017, from corresponding PCT application No. PCT/EP2016/000658.

Primary Examiner — Freddie Kirkland, III
(74) Attorney, Agent, or Firm — Young & Thompson

(57) ABSTRACT

Disclosed is a sensor for measuring the pressure prevailing in a motor vehicle cylinder head, the sensor including a tubular body and an element sensitive to variations in the pressure, mounted in the tubular body. The sensitive element includes a tether including a fixing portion for fixing the tether to the tubular body, a tubular portion and a membrane fixed to the tubular portion at a connecting zone. The sensor is notable in that the connecting zone and the fixing zone are separated by a non-zero distance along the longitudinal axis and in that the tether includes, between the connecting zone and the fixing portion, a portion for absorbing a mechanical deformation.

20 Claims, 2 Drawing Sheets

(56) References Cited

U.S. PATENT DOCUMENTS

| | | | |
|---|---|---|---|
| 8,256,279 B2 * | 9/2012 | Siegenthaler | G01L 23/10 73/114.16 |
| 8,950,247 B2 * | 2/2015 | Borgers | G01M 15/08 73/114.19 |
| 9,476,796 B2 * | 10/2016 | Scholzen | G01L 19/04 |
| 9,500,365 B2 * | 11/2016 | Maier-Schleich | G01L 19/0645 |
| 9,835,523 B2 * | 12/2017 | Misaizu | G01L 23/10 |
| 2010/0294028 A1 | 11/2010 | Siegenthaler et al. | |
| 2015/0027213 A1 | 1/2015 | Maier-Schleich et al. | |
| 2015/0128687 A1 | 5/2015 | Misaizu et al. | |
| 2017/0343437 A1 * | 11/2017 | Ura | G01L 7/022 |

FOREIGN PATENT DOCUMENTS

| | | |
|---|---|---|
| CN | 104246464 A | 12/2014 |
| DE | 10 2011 087 641 A1 | 6/2013 |
| DE | 10 2012 202 058 A1 | 8/2013 |
| DE | 10 2014 102 129 A1 | 11/2014 |
| FR | 2 977 669 A1 | 1/2013 |
| WO | 2013/117414 A1 | 8/2013 |

* cited by examiner

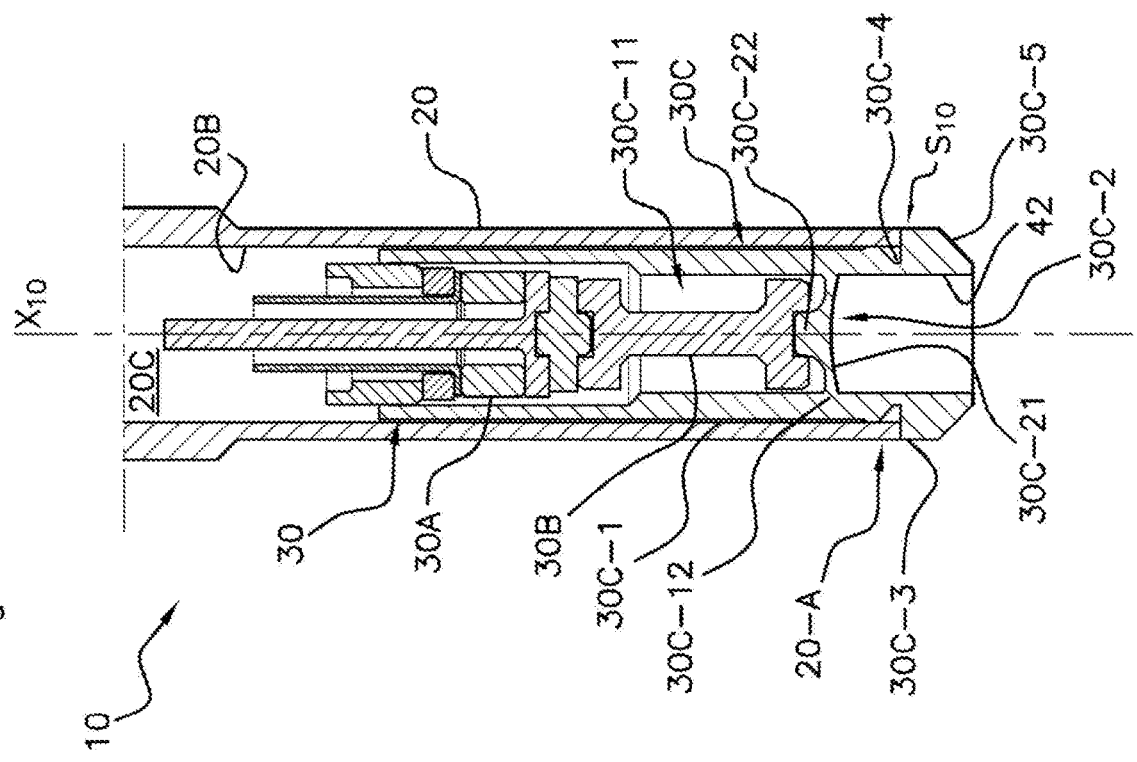
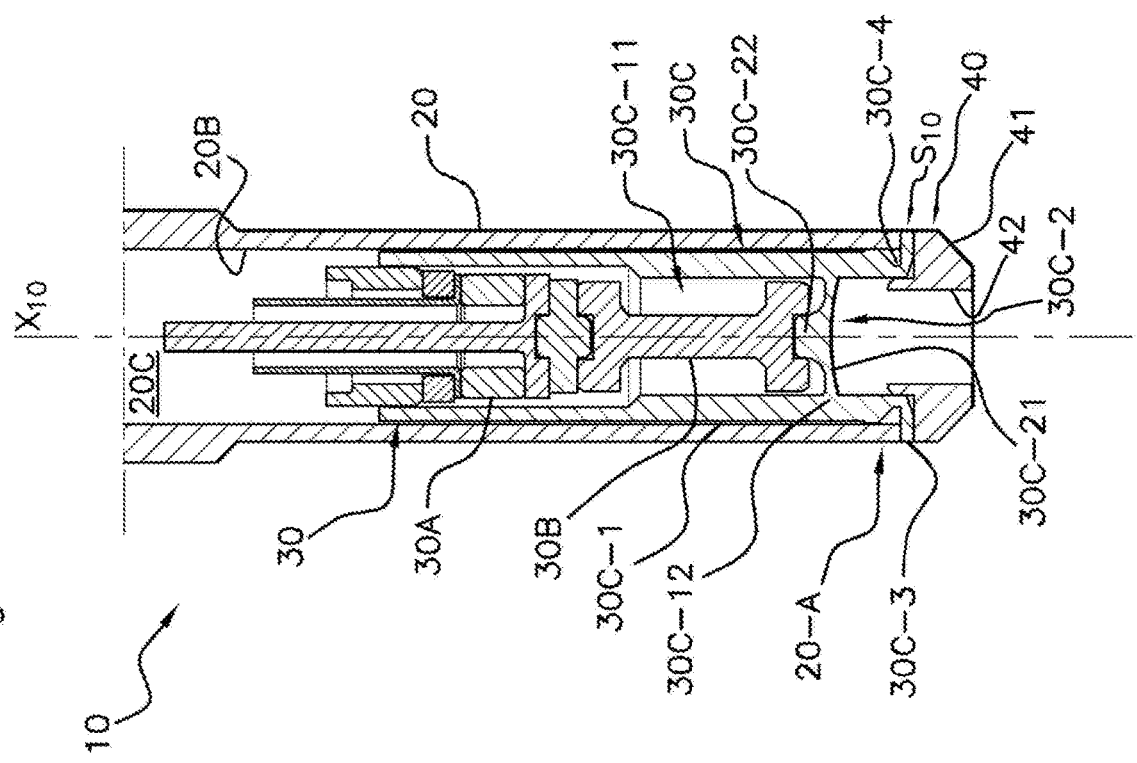

SENSOR FOR MEASURING THE PRESSURE PREVAILING IN A MOTOR VEHICLE CYLINDER HEAD

The present invention relates to the field of electronic measurement sensors and more particularly concerns a pressure measurement sensor and a motor vehicle including such a sensor.

The invention finds one particular application in the field of pressure measurement sensors mounted on motor vehicle engine cylinders.

BACKGROUND OF THE INVENTION

In a motor vehicle comprising cylinders closed by a cylinder head for the combustion of the fuel, it is known to mount through a bore in the cylinder head a sensor for each cylinder for measuring the pressure of the gases in said cylinder and generating a signal representing the variations of the value of that pressure over time.

This signal is sent to a computer of the vehicle in order to control various parameters. For example, the signal can be used by a computer to decide the optimum time to inject fuel into the cylinder in order to improve the operation of the engine and/or to reduce the emission of pollutants.

As shown in FIG. 1, this pressure measurement sensor 1 comprises a tubular body 2 extending along a longitudinal axis $X_1$ and an element 3 sensitive to the pressure variations mounted in said tubular body 2.

The sensitive element 3 comprises a piezoelectric module 3A for converting a mechanical stress into an electrical voltage, a member 3B for transmitting said mechanical stress to the piezoelectric module 3A and a flange 3C receiving the piezoelectric module 3A and the transmission member 3B.

This flange 3C comprises a tubular portion 3C-1, an elastically deformable membrane 3C-2 and a shoulder 3C-3.

The piezoelectric module 3A and the transmission member 3B are housed in the tubular portion 3C-1 which is itself mounted coaxially in the body 2.

The membrane 3C-2 comprises a circular portion 3C-21 extending transversely in the tubular portion 3C-1 so as to block it and a connecting protuberance 3C-22 extending from the center of said circular portion 3C-21 along the longitudinal axis $X_1$ in order to connect the membrane 3C-2 to the transmission member 3B.

The shoulder 3C-3 extends radially relative to the longitudinal axis $X_1$ from the tubular portion 3C-1 to enable the fixing of the flange 3C to the body 2 by welding at the level of a first weld $S_1$.

The sensor 1 finally comprises a skirt 4 fixed by welding to the shoulder 3C-3 at the level of a second weld $S_2$. This skirt 4 has a conical shape enabling force-fitting of the measurement sensor 1 in a bore in the cylinder head of the vehicle.

When the sensor 1 is operating the membrane 3C-2 is deformed by the effect of the pressure prevailing in the cylinder, thus generating a mechanical stress transmitted by the transmission member 3B to the piezoelectric module 3A that converts it into an electrical voltage representing the pressure prevailing in the cylinder.

A sensor 1 of the above kind has disadvantages, however.

First of all, an assembly of this type necessitates on the one hand laser welding of the shoulder 3C-3 to a body 2 and on the other hand laser welding of the skirt 4 to the shoulder 3C-3, which can prove complex, time-consuming and costly.

Moreover, the cylinder head may be deformed by the effect of the temperature of and stresses in the engine, which can then lead to deformation of the sensor 1 and notably of the membrane 3C-2. Such deformation of the membrane 3C-2 is liable to interfere with the transmission of the mechanical stress between the membrane 3C-2 and the piezoelectric module 3A and therefore with the operation of the sensor 1.

In order partly to alleviate this disadvantage, it is known to mount the membrane 3C-2 at the level of the shoulder 3C-3 in order to stiffen it and thus to limit the impacts on the membrane 3C-2 of deformation of the sensor 1.

However, in this case, when welding the shoulder C3-3 to the body 2 (weld $S_1$) and welding the skirt 4 to the shoulder 3C-3 (weld $S_2$), the heat given off by such welds at the level of the shoulder 3C-3 is transmitted to the membrane 3C-2 and can lead to deformation thereof which again has the aforementioned disadvantages.

Moreover, force-fitting the sensor 1 in the bore in the cylinder head can lead to mechanical deformation of the skirt 4 and the shoulder 3C-3, which are subjected to forces E, such as then to deform the membrane 3C-2, which has the aforementioned disadvantages.

There is therefore a requirement for a pressure sensor that is easy to assemble with no risk of deformation of the membrane.

SUMMARY OF THE INVENTION

To this end the invention concerns a sensor for measuring the pressure prevailing in a cylinder of a motor vehicle, said sensor comprising a tubular body extending along a longitudinal axisbody and an element sensitive to the variations of said pressure mounted in said tubular body, said sensitive element comprising a piezoelectric module for converting a mechanical stress into an electrical voltage representing the value of the pressure prevailing in the cylinder, a member for transmitting said mechanical stress to the piezoelectric module and a flange receiving the piezoelectric module and the transmission member, said flange comprising:

a tubular portion mounted coaxially in the body and in which are housed the transmission member and the piezoelectric module, a membrane elastically deformable to generate a mechanical stress under the effect of said pressure, extending at the center of the tubular portion and being connected, on the one hand, to said tubular portion at the level of a connecting zone and, on the other hand, to the piezoelectric module by said transmission member, and a portion for fixing the flange to the body extending radially relative to the longitudinal axis from the tubular portion, the sensor being noteworthy in that the connecting zone and the fixing portion are separated by a non-zero distance along the longitudinal axis and in that the flange comprises between the connecting zone and the fixing portion a portion for absorbing a mechanical deformation.

Thanks to the sensor according to the invention, the absorption portion is deformed if the flange is subjected to forces. The absorption portion being situated between the connecting zone of the membrane and the portion for fixing the flange to the body, the membrane is then protected from the forces to which the fixing portion is subjected. A sensor of this kind is therefore protected from malfunctions linked to the transmission of the mechanical stresss from the membrane.

The distance separating the connecting zone and the fixing portion is preferably greater than 1.5 mm in order to protect the membrane from the variations of temperature of the fixing portion.

The absorption portion preferably has at least one thickness less than the thickness of the tubular portion that is situated at the level of the connecting zone in order for the tubular portion to be deformed at the level of the absorption portion when it is subjected to forces, thus protecting the membrane from the deformations.

The absorption portion advantageously has a minimum thickness less than 0.5 mm.

The absorption portion advantageously extends along the longitudinal axis a distance greater than 0.5 mm.

According to one feature of the invention, the fixing portion and the absorption portion are in one piece with the tubular portion in order to be easy to manufacture.

In a first embodiment, the sensor comprises a conical skirt welded to the fixing portion, the fixing portion extends along the longitudinal axis a thickness less than 0.5 mm in order to weld the skirt and the fixing portion to the body with a single laser weld.

In a second embodiment the sensor comprises a conical skirt, said skirt being in one piece with the fixing portion in order to be easy to manufacture.

The invention also concerns a vehicle comprising a cylinder head, comprising at least one cylinder, and at least one measurement sensor as described above for sensing the pressure in said cylinder, said sensor being mounted in said cylinder head.

The invention also concerns a method of assembling a measurement sensor as described above comprising a single step of welding the skirt and the fixing portion to the tubular body. A single laser weld advantageously enables easy and rapid manufacture of the sensor whilst limiting the risks of deformation of the membrane by the heat given off during welding.

BRIEF DESCRIPTION OF THE DRAWINGS

The invention will be better understood after reading the following description given by way of example only with reference to the appended drawings, in which:

FIG. 2 is a diagrammatic view in longitudinal section of the pressure sensor according to one embodiment of the invention, FIG. 3 is a diagrammatic view in longitudinal section of the sensor according to a second embodiment of the invention.

Figure 1:
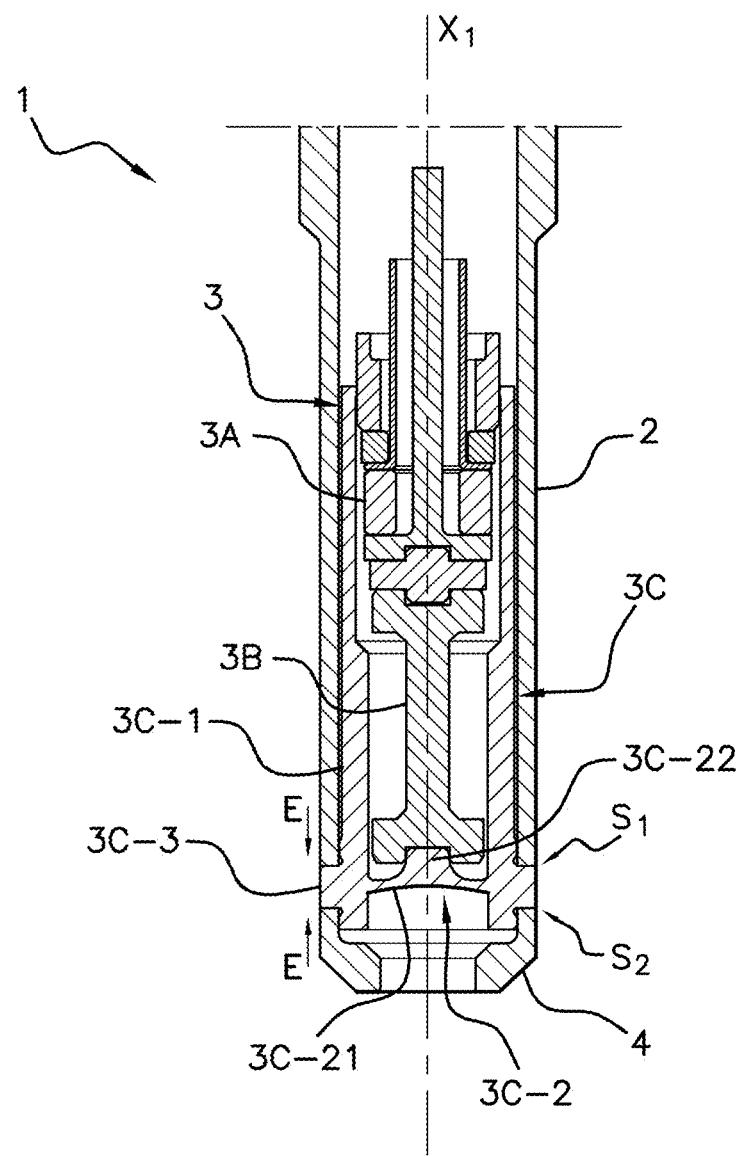
FIG. 1 is a diagrammatic view in longitudinal section of a prior art pressure sensor.

It should be noted that the figures show the invention in detail for its reduction to practice, said figures being of course also able to serve to define the invention better if necessary.

DETAILED DESCRIPTION OF THE PREFERRED EMBODIMENTS

The sensor according to the invention is intended to be mounted on a cylinder head of a motor vehicle in order to measure the pressure of the gases contained in a cylinder of said cylinder head. To this end the sensor is configured to be introduced into a bore (not shown) in the cylinder head opening on one side into a cylinder and on another side to the exterior of the cylinder head.

In known manner a sensor of this kind converts the mechanical stress generated by the pressure prevailing in the cylinder into an electrical signal representing said pressure that is sent to an onboard computer of the vehicle in order to optimize various operating parameters of the vehicle such as its fuel consumption, for example.

Referring to FIG. 2, there is shown a pressure measurement sensor 10 according to a first embodiment of the invention.

The sensor 10 comprises firstly a tubular body 20 of elongate shape extending along a longitudinal axis $X_{10}$ between a holding end (not shown) and a measuring end 20A and comprising a substantially cylindrical interior surface 20B delimiting an interior cavity 20C.

The holding end is used to mount the sensor 10 in and to remove it from the bore in the cylinder head by screwing it in and unscrewing it from outside the cylinder head. To provide a mounting of this kind the body 10 features an external screwthread (not shown) on a portion of its exterior surface cooperating with an internal screwthread in the bore.

The measuring end 20A is configured to receive an element 30 sensitive to the variations of the pressure of the gases in the cylinder.

This sensitive element 30 is mounted both at the measuring end 20A and in the interior cavity 20C of the tubular body 20.

To this end the measuring end 20A features a circular surface for welding the sensitive element 30 to the tubular body 20 extending in a plane perpendicular to the longitudinal axis $X_{10}$ and notably enabling immobilization of the sensitive element 30 in the tubular body 20 along the longitudinal axis $X_{10}$.

In order to measure the pressure prevailing in a cylinder the sensitive element 30 comprises a piezoelectric module 30A, a transmission member 30B and a flange 30C.

The flange 30C is adapted on the one hand to receive the piezoelectric module 30A and the transmission member 30B and on the other hand to receive a mechanical stress generated by the pressure prevailing in the cylinder.

The transmission member 30B extends longitudinally along the longitudinal axis $X_{10}$ and is adapted to be moved along said longitudinal axis $X_{10}$ by the effect of a mechanical stress received by the flange 30C in order to transmit it to the piezoelectric module 30A.

The piezoelectric module 30A is configured to convert a mechanical stress transmitted by the transmission member 30B into an electrical voltage representing the value of the pressure prevailing in the cylinder. The working of a piezoelectric module 30A of this kind being known to the person skilled in the art, it will not be described in more detail.

The flange 30C will now be described in more detail. The flange 30C comprises a tubular portion 30C-1, a membrane 30C-2 extending in said tubular portion 30C-1 and a portion 30C-3 for fixing the flange 30C to the sensor body 2.

The tubular portion 30C-1 extends longitudinally along the axis $X_{10}$ and defines a hollow interior space 30C-11 in which are housed the transmission member 30B and the piezoelectric module 30A. The tubular portion 30C-1 comprises a zone 30C-12 for connecting the membrane 30C-2 to the tubular portion 30C-1 in the hollow interior space 30C-11. The tubular portion 30C-1 preferably has at the level of the connecting zone 30C-12 a thickness of the order of 0.8 mm in order to stiffen the membrane 30C-2.

The membrane 30C-2 comprises a circular portion 30C-21 extending transversely in the tubular portion 30C-1 so as to block it and a connecting protuberance 30C-22 extending from the center of said circular portion 30C-21 along the longitudinal axis $X_{10}$ in order to connect the membrane 30C-2 to the transmission member 30B. The circular portion 30C-21 has a small thickness, of the order of 0.3 mm, enabling its elastic deformation by the effect of the pressure prevailing in the cylinder.

In the sensor according to a preferred embodiment of the invention the membrane 30C-2 is in one piece with the tubular portion 30C-1. There has been shown a membrane 30C-2 in one piece with the tubular portion 30C-1 but it goes without saying that the membrane 30C-2 could be a separate part mounted in the interior space of the tubular portion 30C-1, for example by gluing, screwing, welding, etc. Likewise, the membrane can be of flattened shape, then extending radially with respect to the longitudinal axis $X_{10}$, or of convex or concave shape.

The fixing portion 30C-3 extends radially with respect to the longitudinal axis $X_{10}$ from the tubular portion 30C-1 and enables fixing by welding of the flange 30C to the body 20 at the level of a weld $S_{10}$. The fixing portion 30C-3 is more particularly adapted to come into contact with the fixing surface of the tubular body 2 in order to be welded in order to assemble the sensor 10. The fixing portion 30C-3 has a thickness along the longitudinal axis $X_{10}$ less than 0.8 mm, preferably of the order of 0.4 mm.

According to one aspect of the invention, the connecting zone 30C-12 of the membrane 30C-2 and the fixing portion 30C-3 are separated by a non-zero distance along the longitudinal axis $X_{10}$ that is preferably greater than 1.5 mm. Such a separation distance advantageously enables protection of the membrane 30C-2 from any deformation of the fixing portion 30C-3 and notably from the heat given off when welding the fixing portion 30C-3 to the tubular body 20.

According to another aspect of the invention the tubular portion 30C-1 has between the connecting zone 30C-12 and the fixing portion 30C-3 an absorption portion 30C-4. This absorption portion 30C-4 has a smaller thickness than the tubular portion 30C-1 that is situated at the level of the connecting zone 30C-12. The thickness at the level of the absorption portion 30C-4 preferably decreases progressively to a thickness less than 0.5 mm. The thickness of the tubular portion 30C-1 is therefore reduced over a length along the longitudinal axis $X_{10}$ of the order of 0.5 mm. An absorption portion 30C-4 of this kind enables deformation of the tubular portion 30C-1 if the fixing portion 30C-3 is subjected to forces but prevents that deformation from propagating to the membrane 30C-2.

To enable force-fitting of the sensor 10 in the bore in the cylinder head, the sensor comprises a skirt 40. The skirt 40 includes a zone for fixing it to the flange 30C and a conical portion 41 enabling force-fitting of the sensor 1 in the bore in the cylinder head.

The skirt 40 is mounted on the flange 30C at the level of the fixing portion 30C-3 on the side opposite the tubular body 2. The fixing portion 30C-3 is therefore connected on the one hand to the tubular body 2 and on the other hand to the skirt 40. The skirt 40 is preferably welded to the flange 30C.

In order to enable the contact of the membrane 30C-2 with the gases in the cylinder the skirt 40 delimits a cylindrical opening 42 at its center.

There has been shown a skirt 40 mounted on the flange 30C but, in a second embodiment, and referring to FIG. 3, the skirt 30C-5 can be in one piece with the fixing portion 30C-3 whilst having the same shapes and dimensions as in the first embodiment of the sensor 10 described above.

Execution of the method of manufacturing the sensor 10 described above is described in the remainder of the description.

When mounting the sensor 10 according to the invention, the sensitive element 30 is assembled first. To this end, the piezoelectric module 30A and the transmission member 30B are mounted in the interior space 30C-11 of the flange 30C, the transmission member 30B being in contact on the one hand with the membrane 30C-2 at the level of the connecting protuberance 30C-22 and on the other hand with the piezoelectric module 30A.

The sensitive element 30 is then mounted coaxially in the tubular body 2 so that the fixing portion 30C-3 is in contact with the measuring end 20A of the body 2.

To secure the assembly the fixing portion 30C-3 and the body 2 are laser welded together at the level of a weld $S_{10}$. The connecting zone 30C-12 of the membrane 30C-2 being separate from the fixing portion 30C-3, the heat given off by the weld $S_{10}$ advantageously does not deform said membrane 30C-2.

In the situation where the sensor 10 comprises an attached skirt 40, the latter is mounted on the flange 30C at the level of the fixing portion 30C-3. To this end, the skirt 40 is welded to the fixing portion 30C-3 on the side opposite the body 2. A laser weld bead having a width of the order of 0.8 mm, the thickness of the fixing portion 30C-3 is advantageously less than or equal to 0.5 mm in order to enable the tubular body 2 and the skirt 40 to be welded to the fixing portion 30C-3 by a single weld $S_{10}$. The risks of deformation of the membrane 30C-2 by the effect of the heat given off when welding are therefore reduced and the process of assembling the sensor is rapid and easy.

The sensor 10 assembled in this way is then introduced into the bore in the cylinder head by the conical end 30C-5, 41. The tubular body 2 is screwed into said bore in order to force-fit the sensor 10 in the bore. The forces caused by force-fitting the conical end 30C-5, 41 by screwing in the holding end of the body 2 are advantageously absorbed by the deformation of the absorption portion 30C-4 of the tubular portion 30C-1 of the flange 30C. Also, the membrane 30C-2 is protected and is not deformed during this mounting operation.

When the sensor 10 operates, the membrane 30C-2 is deformed by the effect of the pressure, thereby generating a mechanical stress transmitted by the transmission member 30B to the piezoelectric module 30A which converts it into a voltage representing the pressure in the cylinder.

It should finally be noted that the present invention is not limited to the examples described above and lends itself to numerous variants evident to the person skilled in the art. In particular, the shapes and the dimensions of the connecting zone 30C-12, the fixing portion 30C-3, the absorption portion as shown in the figures so as to illustrate one embodiment of the invention should not be interpreted as limiting the invention.

The invention claimed is:

1. A sensor (10) for measuring the pressure prevailing in a cylinder of a motor vehicle, said sensor (10) comprising:
a tubular body (20), extending along a longitudinal axis (X10), and having a conical end and an opposing holding end configured for holding the tubular body (20); and
a sensitive element (30) that is sensitive to variations of the pressure prevailing in the cylinder, mounted in said tubular body (20),
said sensitive element (30) comprised of a piezoelectric module (30A) that converts a mechanical stress into an electrical voltage representing a value of the pressure prevailing in the cylinder, a structural member (30B) that transmits said mechanical stress to the piezoelectric module (30A), and a flange (30C) receiving the piezoelectric module (30A) and the transmission member (30B), said flange (30C) comprising:
- a tubular portion (30C-1) with a first end and an opposite second end, the tubular portion (30C-1) mounted coaxially in the body (20) and extending longitudinally along the longitudinal axis (X10) from the first end to the second end, an interior of the tubular portion having a membrane positioned therein at a connecting zone (30C-12) of the tubular portion (30C-1) distanced from both the first end and the second end, a first side of the membrane facing the first end and delimiting a first hollow interior space (30C-11) along a first length of the tubular portion, and an opposing second side of the membrane facing the second end and delimiting a second hollow interior space along a second length of the tubular portion, the first hollow interior space (30C-1) housing therein the transmission member (30B) and the piezoelectric module (30A),
- the membrane (30C-2) being elastically deformable to generate a mechanical stress under an effect of the pressure prevailing in the cylinder, and connected to said tubular portion (30C-1) at a level of the connecting zone (30C-12) in the first hollow interior space (30C-11), and also connected to the piezoelectric module (30A) via said transmission member (30B), and
- a fixing portion (30C-3) for fixing the flange (30C) to the body (20), the fixing portion located at the second end of the tubular portion and formed as a radial extension of the tubular portion (30C-1) extending radially relative to the longitudinal axis (X10)

wherein, the fixing portion (30C-3) is adapted to come into contact with a fixing surface of the tubular body (20) at the level of a weld (S10), wherein said connecting zone (30C-12) and the fixing portion (30C-3) are separated by a non-zero distance along the longitudinal axis (X10), and wherein the flange (30C) further comprises, between the connecting zone (30C-12) and the fixing portion (30C-3) at the second end of the tubular portion, an absorption portion (30C-4) configured to absorb, by mechanical deformation, forces on the conical end (30C-5) caused by force-fitting by screwing in the holding end of the tubular body (20).

2. The measurement sensor (10) according to claim 1, wherein the distance separating the connecting zone (30C-12) and the fixing portion (30C-3) is greater than 1.5 mm.

3. The measurement sensor (10) as claimed in claim 2, wherein the absorption portion (30C-4) of the flange has at least one thickness less than the thickness of the tubular portion (3C-1) that is situated at the level of the connecting zone (30C-12).

4. The measurement sensor (10) as claimed in claim 2, wherein the absorption portion (30C-4) extends along the longitudinal axis (X10) over a distance greater than 0.5 mm.

5. The measurement sensor (10) as claimed in claim 2, wherein the fixing portion (30C-3) and the absorption portion (30C-4) are formed as one piece with the tubular portion (30C-1).

6. The measurement sensor (10) as claimed in claim 2, wherein the conical end is formed as a conical skirt (40) welded to the fixing portion (30C-3) of the flange, the fixing portion (30C 3) extends along the longitudinal axis a thickness less than 0.5 mm.

7. The measurement sensor (10) as claimed in claim 1, wherein the absorption portion (30C-4) of the flange has at least one thickness less than the thickness of the tubular portion (3C-1) that is situated at the level of the connecting zone (30C-12).

8. The measurement sensor (10) as claimed in claim 7, wherein the absorption portion (30C-4) has a minimum thickness less than 0.5 mm.

9. The measurement sensor (10) as claimed in claim 8, wherein the absorption portion (30C-4) extends along the longitudinal axis (X10) over a distance greater than 0.5 mm.

10. The measurement sensor (10) as claimed in claim 8, wherein the fixing portion (30C-3) and the absorption portion (30C-4) are formed as in one piece with the tubular portion (30C-1).

11. The measurement sensor (10) as claimed in claim 7, wherein the absorption portion (30C-4) extends along the longitudinal axis (X10) over a distance greater than 0.5 mm.

12. The measurement sensor (10) as claimed in claim 7, wherein the fixing portion (30C-3) and the absorption portion (30C-4) are formed as one piece with the tubular portion (30C-1).

13. The measurement sensor (10) as claimed in claim 1, wherein the absorption portion (30C-4) extends along the longitudinal axis (X10) over a distance greater than 0.5 mm.

14. The measurement sensor (10) as claimed in claim 13, wherein the fixing portion (30C-3) and the absorption portion (30C-4) are formed as one piece with the tubular portion (30C-1).

15. The measurement sensor (10) as claimed in claim 1, wherein the fixing portion (30C-3) and the absorption portion (30C-4) are formed as one piece with the tubular portion (30C-1).

16. The measurement sensor (10) as claimed in claim 1, wherein the conical end is formed as a conical skirt (40) welded to the fixing portion (30C-3) of the flange, the fixing portion (30C 3) extends along the longitudinal axis a thickness less than 0.5 mm.

17. A method of assembling a measurement sensor (10) as claimed in claim 16 comprising a single step of welding the skirt (40) and the fixing portion (30C-3) to the tubular body (20).

18. The measurement sensor (10) as claimed in claim 1, wherein the conical end is formed as a conical skirt (30C-5), said skirt (30C-5) being in one piece with the fixing portion (30C-3).

19. A vehicle comprising a cylinder head with a cylinder and a measurement sensor (10) as claimed in claim 1 for measuring the pressure in said cylinder, said measurement sensor being mounted in said cylinder head.

20. The measurement sensor (10) as claimed in claim 1, wherein the absorption portion of the flange is formed as a region of reduced thickness where an outer radial surface of the flange recedes relative to the longitudinal axis (X10).

* * * * *